H. H. DAVIS.
EFFICIENCY INDICATOR FOR EXPLOSION MOTORS.
APPLICATION FILED DEC. 3, 1919.
1,429,192.
Patented Sept. 12, 1922.
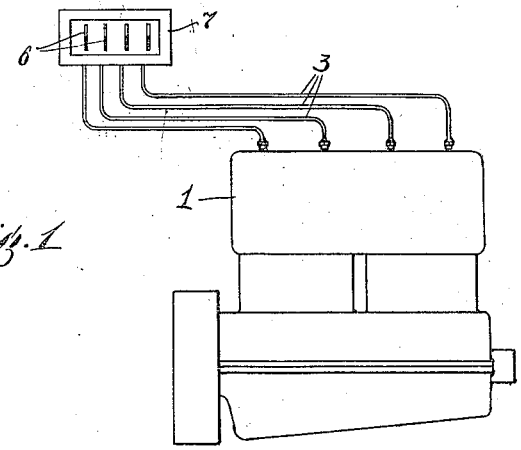
Fig. 1.
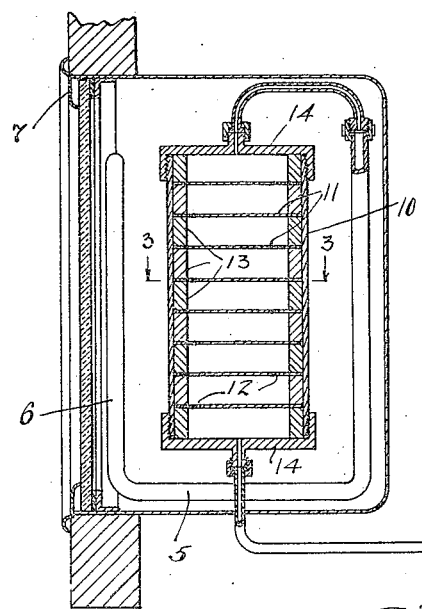
Fig. 2.
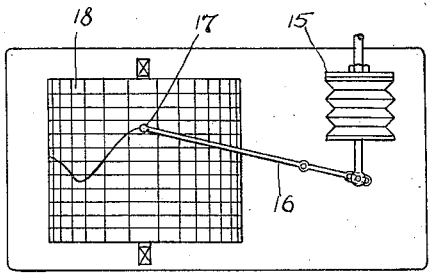
Fig. 4.
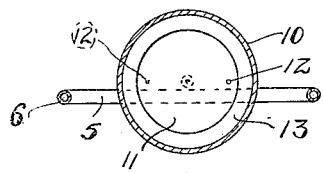
Fig. 3.
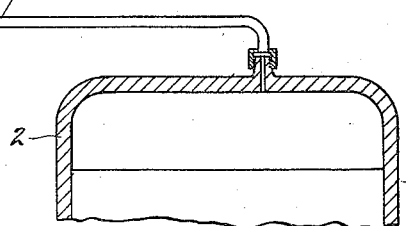
INVENTOR
Howard H. Davis.
By Jay, Oberlin & Jay
ATTORNEYS.

Patented Sept. 12, 1922.

1,429,192

UNITED STATES PATENT OFFICE.

HOWARD H. DAVIS, OF CLEVELAND, OHIO.

EFFICIENCY INDICATOR FOR EXPLOSION MOTORS.

Application filed December 3, 1919. Serial No. 342,256.

*To all whom it may concern:*

Be it known that I, HOWARD H. DAVIS, a citizen of the United States, and a resident of Cleveland, county of Cuyahoga, and State of Ohio, have invented a new and useful Improvement in Efficiency Indicators for Explosion Motors, of which the following is a specification, the principle of the invention being herein explained and the best mode in which I have contemplated applying that principle, so as to distinguish it from other inventions.

The object of the present invention is to provide a device or apparatus which will indicate, and record if desired, the pressure generated within an internal combustion or explosion motor by ignition of the charge. To the end that such an indicator may be readily readable, owing to the frequency of the explosions, it is necessary that the net result, so to speak, of successive explosions, rather than the individual effect thereof, should be shown. At the same time the device must be responsive to variations in the effective pressure generated as the engine is speeded up, or labors under an increasing load. The purpose of securing an indication of the foregoing is to enable a determination to be made as to the efficiency of the engine, something that, so far as I am aware, has never heretofore been satisfactorily done by direct observation, but is usually arrived at only by inference or by direct power tests in the shop.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a more or less diagrammatic view of a four-cylinder internal combustion engine with a front elevation of my improved indicator connected therewith; Fig. 2 is a transverse sectional view of such indicator showing one unit thereof with diagrammatic showing of connections to corresponding engine cylinder; Fig. 3 is a transverse section of a portion of such unit taken on the plane indicated by the line 3—3, Fig. 2; and Fig. 4 is a side elevation of a modified form of the indicator showing same adapted for the making of a permanent record.

As shown in Figs. 1, 2 and 3, my improved device or apparatus comprises as many units as there are cylinders in engine 1, each unit being independently connected with the interior of one such cylinder 2 through a suitable duct 3. Where the engine cylinders are provided with pet-cocks such ducts 3 may be conveniently attached through the bases of such pet-cocks, or the connection may be independently made as shown in the drawings.

Each unit of the device includes a U-shaped tube 5 sealed at one end and containing a suitable liquid, as for example mercury. The leg 6 of the tube, which terminates in such sealed end, is held in a suitable frame or plate 7 which, in the case of an automobile, will be conveniently mounted in the usual instrument board, so as to be readily observable from the driver's seat. The back of the tube-portion in question may have a coating of enamel, or a background of suitable color may be otherwise provided so as to cause the column of mercury or other liquid to stand out, as in ordinary thermometer construction.

The open end of said tube 5 is connected with one end of a cylindrical chamber 10 that is provided with a plurality of transverse partitions 11 formed with small apertures 12, preferably one aperture only to each partition. Such partitions are then arranged so that the apertures are in staggered relation to each other, as best shown in Fig. 2. The partitions preferably consist of thin sheet metal disks having a diameter substantially equal to that of chamber 10, and are held in properly spaced relation in said chamber by means of interposed rings or washers 13, the aggregate thickness of the assembled washers and disks being slightly in excess of the length of the chamber, so that the caps 14 which are threaded onto the ends of said chamber to close the same, will serve to tightly compress the interior assembly together.

The opposite end of chamber 10, from that with which tube 5 is connected, is connected by means of duct 3 with the engine cylinder 2 as previously described. There is associated with the leg 6 of each tube a suitable scale on which is indicated the normal well of the mercury therein when the corresponding engine cylinder is working properly. The effect, in other words, of the successive explosions in the cylinder is not to cause a rapid pulsation of the mercury column, but, due to the interposition of the baffle means which the disks 11 in chamber 10 constitute, a constant pressure is exerted on the mercury column in tube 5 for any given series of pulsations transmitted from the engine cylinder. However, as the speed of the piston varies, or the character of the pulsations in the engine changes, the column of mercury will rise or fall. By experiment or otherwise the proper level for the mercury, when the engine is performing efficiently, may be determined and marked on the scale, and thus the observer may readily ascertain, by simply noting the position of such column, whether any of the cylinders of his engine is failing in performance.

Instead of a mercury column being connected with the chamber 10, I may connect therewith a graphic form of indicator, such for example as is employed in the familiar recording barometer, consisting of a corrugated sealed chamber 15 with which is connected one end of a lever arm 16, the other end of which carries a suitable stylus 17. By moving a sheet 18 across the path of such stylus, a graphic record will obviously be produced, showing the rise and fall of the effective pressure within the engine cylinder at various speeds and under various conditions of load. This form of the invention instead of being coupled to an individual cylinder of the engine may be connected to the common exhaust, since it will record the operation of the cylinders one after the other in a recurring cycle. The engine should, of course, be run quite slowly and the device will be connected with the exhaust line through a branch, and beyond the muffler, so as not to receive the full force of the explosions nor interfere with the discharge of waste gases. This device will be more particularly of use about a garage or repair shop in order to test quickly and conveniently the engine performance.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination with a support of a transparent U-shaped tube sealed at one end and containing a suitable liquid, a cylindrical chamber having terminal caps screwed thereon, a plurality of alternating rings and thin sheet metal disks held tightly compressed by said caps, said disks being provided with small apertures, the apertures in successive disks being arranged in staggered relation to each other, a duct connecting the chamber through one of its screw caps with the open end of the U-shaped tube and through the other cap with the cylinder of an explosion motor.

2. A device for visibly indicating the relative performance of the individual cylinders of a multi-cylindered explosion motor, having in combination an instrument board, a plurality of transparent U-shaped tubes sealed at one end and containing a suitable liquid, arranged in closely parallel relation upon said instrument board, a plurality of ducts connecting the open ends of said tubes with the respective cylinders of the motor, a plurality of cylindrical chambers interposed in the several lines of the duct communications with the cylinders, each of said chambers being provided with a number of partitions extending transversely of said line of communication, and apertures in said partitions in staggered relation to the apertures in the immediately adjacent partitions.

Signed by me, this 29 day of November, 1919.

HOWARD H. DAVIS.